July 28, 1970  M. G. BOISSEVAIN  3,521,976
METHOD OF AND APPARATUS FOR LIQUID HANDLING AND DIALYSIS
Original Filed Jan. 15, 1969  3 Sheets-Sheet 3
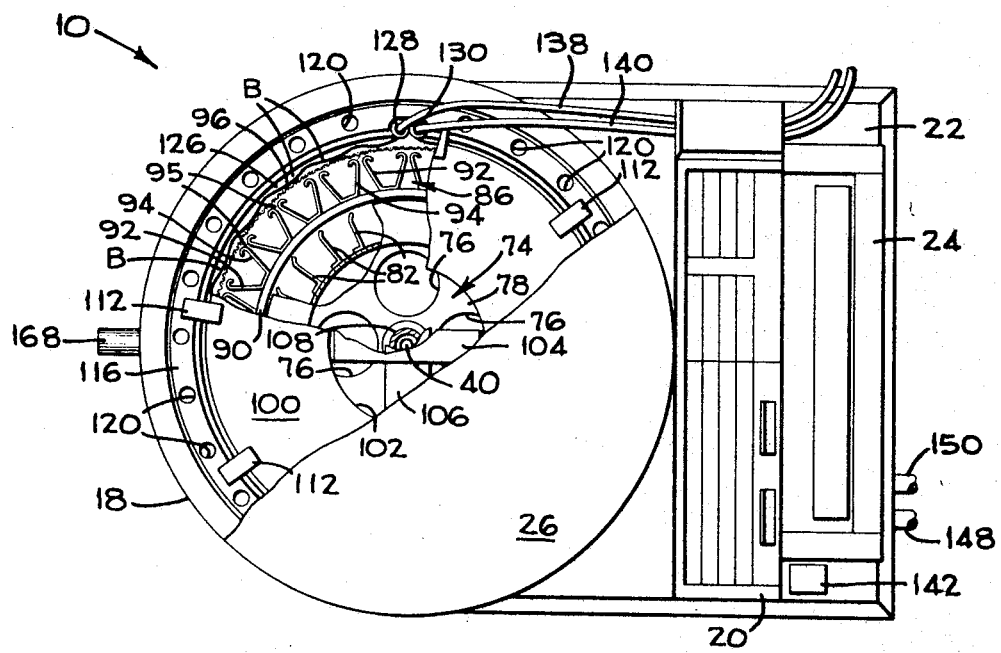
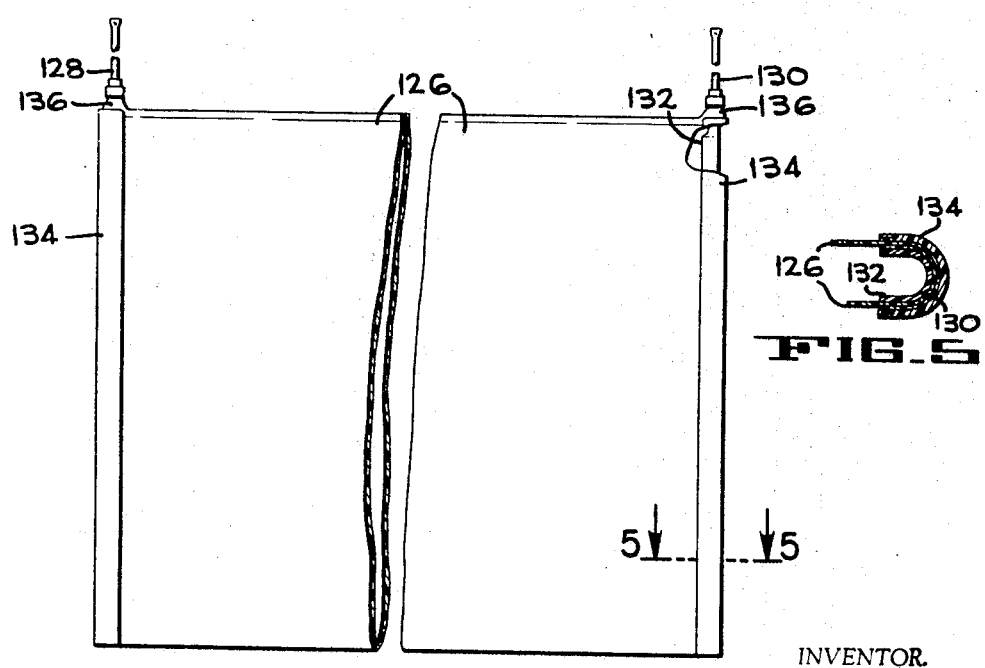
INVENTOR.
MATHEW G. BOISSEVAIN
BY F. W. Anderson
C. E. Triggs
ATTORNEYS United States Patent Office 3,521,976
Patented July 28, 1970

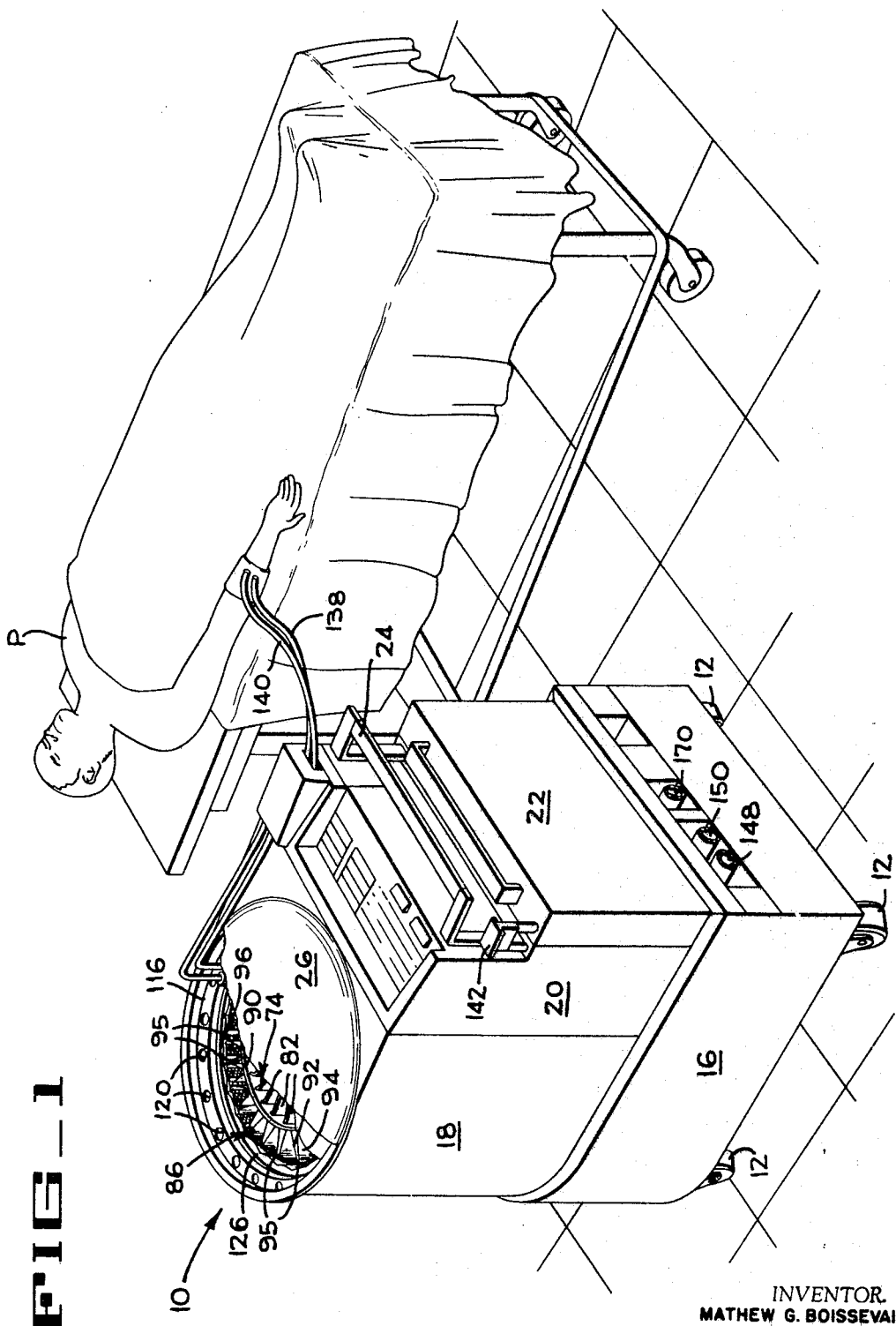

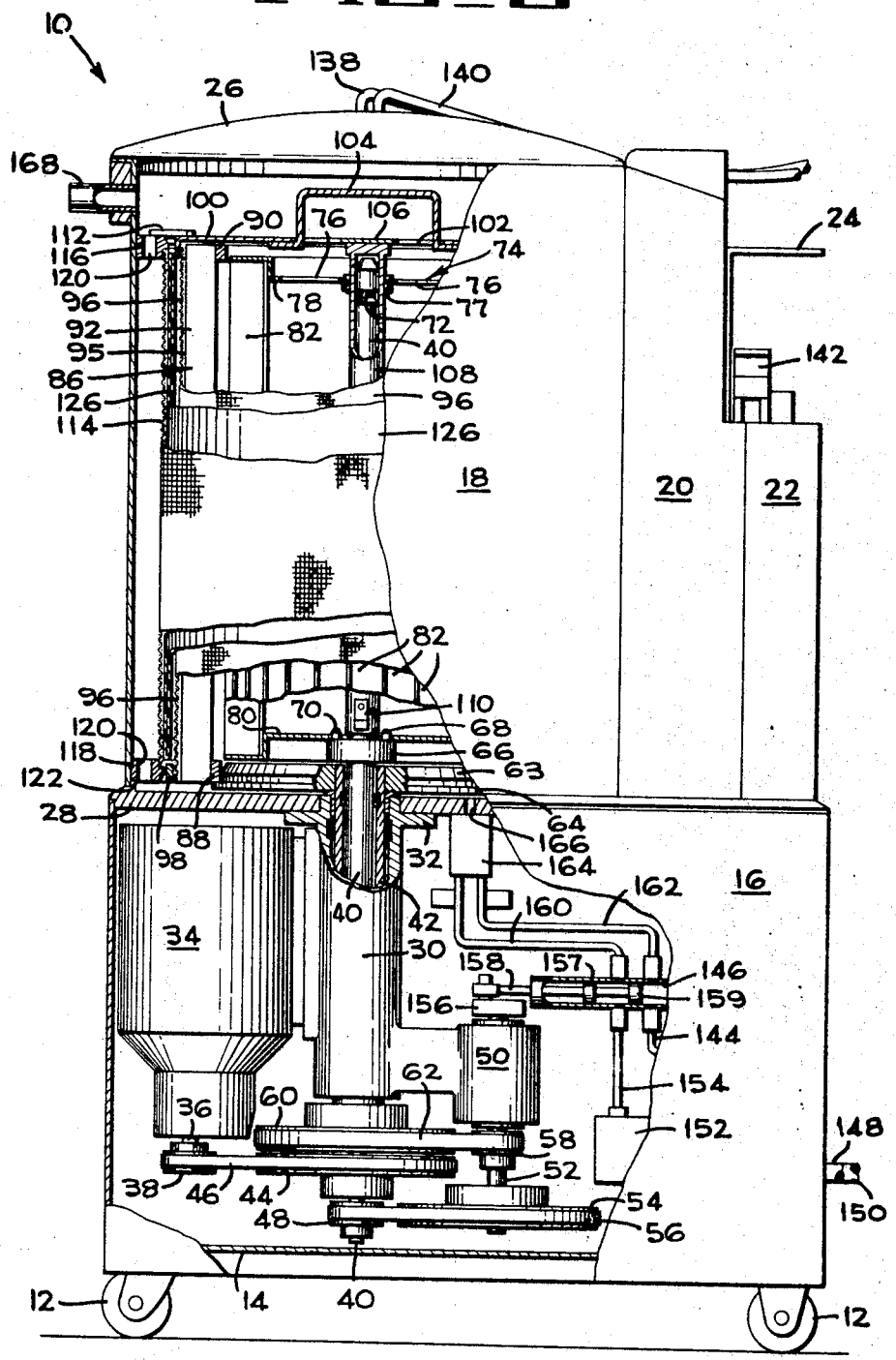

3,521,976
METHOD OF AND APPARATUS FOR LIQUID
HANDLING AND DIALYSIS
Mathew G. Boissevain, Los Altos Hills, Calif., assignor to FMC Corporation, San Jose, Calif., a corporation of Delaware
Original application Jan. 15, 1968, Ser. No. 697,837. Divided and this application Apr. 14, 1969, Ser. No. 840,872
Int. Cl. F04b 9/10, 43/8; B01d 13/00
U.S. Cl. 417—53                    2 Claims

ABSTRACT OF THE DISCLOSURE

An elongated rectangular conduit, made of a colloidal semipermeable membrane, is connected in flow communication with a source of liquid to be treated and positioned in a tank. Nozzles within the tank direct a pair of jet streams of dialysate against one side of the conduit, forcing the conduit against a backup support and pinching off a vertical pocket of liquid therein. These dialysate jet streams slowly move from the inlet to the outlet of the conduit, forcing the liquid within the pocket to travel through the conduit. The dialysate, after impinging against the conduit, is circulated thereabout so that dialysis takes place through the conduit membrane as the liquid travels through the conduit.

This application is a division of application Ser. No. 697,837, filed Jan. 15, 1968, now Pat. No. 3,479,280.

BACKGROUND OF THE INVENTION

Field of the invention

This invention relates to liquid handling, purification and separation, and more particularly, to a dialyzer and method of dialysis that is especially adapted for the purification of blood.

Description of the prior art

Known types of artificial kidney machines are characterized by high costs. At the present time, it is estimated to cost $10,000 per year to treat a patient with an artificial kidney machine. This annual expense represents amortization of the initial cost of the machine, labor costs for operation and maintenance costs including the replacement of membrane coils.

In existing machines, it is difficult to maintain an even parallel flow between the membranes and unless such flow is maintained, the efficiency of the dialysis process is reduced. Furthermore, blood tends to stagnate and clot in dead end passages which do not return to the main stream of flow. The internal resistance to flow in existing machines is usually high so that blood pumps are required and such pumps cause damage to the platelets in the blood. Another feature of existing machines which presents a problem is the priming volume or blood outside of the patient during the dialysis operation. Often, this blood demand is so large that it is necessary to give the patient a blood transfusion with each treatment.

Summary of the Invention

A method of liquid handling is disclosed for conveying small quantities of liquid through a conduit, with a minimum amount of pressure, while maintaining an even flow. A liquid conveyor utilizing this method includes an elongated flexible conduit which is supported on one side and at least one pair of movable nozzles are directed towards the opposite side of the conduit. Jet streams of fluid are projected from the nozzles and impinge against the conduit in spaced relationship to each other. The conduit is pinched against the support at the points of impingement of the jet streams to form a pocket and a quantity of liquid is trapped therein. This quantity of liquid within the pocket is impelled through the conduit by moving the nozzles so that the jet streams travel in spaced relationship along the conduit.

This method of liquid handling is particularly suitable for dialysis wherein the conduit is made of a colloidal semipermeable membrane and the fluid discharged from the nozzles is dialysate. Dialysis is performed by the steps of directing a liquid to be treated to flow into the conduit, directing at least one pair of jet streams of dialysate to impinge against the conduit to trap a pocket of liquid therein, moving the jet streams in spaced relationship along the conduit to impel the pocket of liquid to travel through the conduit and circulating the dialysate of the jet streams after impingement against the conduit to flow thereabout so that dialysis occurs through the conduit membrane.

The conduit used for dialysis of blood in accordance with this invention is made of a tubular piece of membrane, such as cellophane, having a rectangular shape. The replacement cost of this conduit is approximately one-seventh the cost of known twin-coil membrane units and a considerable savings is achieved over a year's time, since the membrane conduit must be replaced with each treatment. The method of impelling flow through the conduit by the action of jet streams of fluid thereagainst causes a fixed quantity of liquid in each pocket to travel separately through the conduit, thus maintaining a controlled volume and even flow. The quantity of liquid in each pocket is regulated by the time of exposure of each pocket to the inlet, and the blood flow rate at the inlet. Thus, the quantity of blood inside the conduit is controlled and the priming volume is held to a minimum so that blood transfusions are unnecessary. No blood pumps which cause damage to the platelets in the blood are required because of the impelling action of the moving jet streams.

BRIEF DESCRIPTION OF THE DRAWINGS

FIG. 1 is a perspective view of a dialyzer embodying the present invention, in use for treating a patient.

FIG. 2 is a side elevation view of the dialyzer shown in FIG. 1, with portions broken away to illustrate underlying structure.

FIG. 3 is a broken top plane view of the dialyzer shown in FIG. 1.

FIG. 4 is a broken side elevation view of a dialysis conduit, as used in the dialyzer shown in FIG. 1.

FIG. 5 is a section taken on the line 5—5 of FIG. 4.

DESCRIPTION OF THE PREFERRED EMBODIMENTS

Looking now at FIG. 1, a dialyzer 10 is shown serving as an artificial kidney to treat the blood of a patient P. The dialyzer is mounted upon four casters 12, which support a frame 14 and a lower housing 16 that extends upward therefrom. A dialysis tank 18, a control panel cabinet 20 and a dialysate reservoir 22 are mounted upon the lower housing. Fixed to the control panel cabinet is a push bar 24 that is used for moving the dialyzer to a desired location. A cover 26 is provided for the dialysis tank and in FIG. 1 this cover is partially broken away to allow the tank interior to be shown.

The dialysis tank 18 has a bottom panel 28, as shown in FIG. 2, with an opening at the center. A hollow mounting column 30 is bolted to the bottom panel below the center opening by a connecting flange 32. Connected to one side of the mounting column is a motor 34 and a drive shaft 36 extends downward from the motor parallel with the column. At the lower end of the drive shaft, a drive pulley 38 is mounted. Rotatably fitted within the mounting column are an inner coaxial shaft 40 and an outer coaxial shaft 42. A large diameter driven pulley 44 is mounted on the inner coaxial shaft opposite the drive pulley mounted on the motor drive shaft, and these pulleys are interconnected by a drive belt 46. The inner coaxial shaft extends downward from the driven pulley and at the lowermost end thereof is mounted a small diameter drive pulley 48.

An arm 50 extends outward from the mounting column 30 on the side opposite from the motor 34 and journaled within the arm is a reduction drive shaft 52 upon which a large driven pulley 54 is mounted. A drive belt 56 is trained about the drive pulley 48 and the driven pulley 54 for transmitting rotation thereto. At a location spaced above the driven pulley 54, a small diameter drive pulley 58 is mounted on the shaft 52 and a large diameter drive pulley 60 is mounted opposite therefrom on the outer coaxial shaft 42. A drive belt 62 is trained about drive pulley 58 and driven pulley 60 for transmitting rotation to the outer coaxial shaft. It should be noted that the differences in pulley diameters reduces the rotation of the outer coaxial shaft with relationship to the rotation of the inner coaxial shaft.

A disk 63 is mounted at the upper end of the inner coaxial shaft inside of the dialysis tank 18 and a support flange 64 extends radially outward around the lower periphery of the disk. A ring 66 projects radially outward from the inner coaxial shaft at a location spaced above the disk and a pair of drive pins 68 and 70 project upwardly therefrom. The inner coaxial shaft extends upward from the ring to the upper portion of the tank and a radial groove 72 is provided near the uppermost end of the shaft.

A distributor assembly 74 fits within the dialysis tank 18 and includes a top plate 78, a bottom plate 80 and a series of vertical vanes 82 extending between the plates, spaced radially about the circumference thereof. Perforations 76 (FIG. 3) are provided in the top plate to permit dialysate to flow downward through the plate and a center opening about which a bushing 77 is fitted provides for the insertion of a screen guide tube, which will later be described. A pair of small holes are provided in the bottom plate enabling the drive pins 68 and 70 to project therein and a center opening is provided to fit the bottom plate around the inner coaxial shaft 40. The bottom plate rests upon the ring 66 and is locked by the drive pins for rotation therewith. Rotation of the distributor assembly forces the dialysate, which flows downward through perforations in the top plate, to flow radially outward between the vertical vanes.

A nozzle rotor assembly 86 is spaced radially outward from the distributor assembly 74 and includes a bottom ring 88 and a top ring 90, between which pairs of converging vanes 92 and 94 are positioned. These vanes are arranged so that they converge outwardly, each pair of converging vanes forming a nozzle 95. Dialysate forced against the vanes by the distributor assembly must pass through the nozzle, which has a very narrow width but a height extending the length of the vanes between top and bottom rings. The bottom ring of the nozzle rotor assembly rests upon support flange 64 of disk 63 and rotation of this disk drives the nozzle rotor assembly. This method of support provides easy liftout disassembly for cleaning purposes.

A cylindrical shaped inner screen 96 is positioned radially outward from the nozzle rotor assembly 86 and has a bottom ring 98 projecting radially outward at the bottom thereof. The screen is suspended from a cover 100 that extends over the nozzle rotor assembly and a center opening 102 is provided in the cover to permit dialysate to flow from above the cover to the space within the distributor assembly 74. A handle 104 is attached to the cover and extends over the center opening so that the inner screen assembly may be lifted upward out of the dialysis tank. Also attached to the cover is a support member 106 that extends across the center opening in a direction transversely of the handle and supports a central guide tube 108 which fits over the upper portion of the inner coaxial shaft 40. A spring detent 110 is fixed to the lower end portion of the central guide tube and when the inner screen assembly is elevated to a loading position, the spring detent engages within the radial groove 72 at the upper end of the inner coaxial shaft. Support ears 112 project radially outward from the periphery of the cover 100 to suspend the inner screen in a stationary position above the rotating nozzle rotor assembly and distributor assembly.

An outer screen 114 is spaced radially outward from the inner screen 96 and extends between an upper ring 116 and a lower ring 118. Support rods, not shown, extend between the upper and lower rings to maintain the spacing therebetween and both the upper and lower rings are perforated with circulation holes 120 to enable dialysate to flow behind the outer screen. The lower ring rests upon a circumferential flange 122 which extends upward from the bottom of the dialysis tank. Support ears 112 of the inner screen rest upon the top of the upper ring and hold the inner screen in position.

A dialysis conduit 126, as shown in FIG. 4, is formed from a tube of colloidal semipermeable material, such as cellophane, and has an inlet tube 128 and an outlet tube 130 connected to the opposite ends thereof. Each of these tubes have a slotted opening 132 which face the interior of the dialysis conduit, while the ends of the conduit are wrapped about the tube, as shown in FIG. 5, and held in place by an extruded plastic U-shaped clamp 134. At the top of each U-shaped clamp, a rubber nipple 136 fits about the tube to seal the upper portions of the conduit.

The dialysis conduit 126 is positioned between the inner screen 96 and the outer screen 114 and extends circumferentially about the tank. The conduit is spaced above the bottom ring 98 of the inner screen and the inlet tube 128 and outlet tube 130 extend upward through an indentation in the upper ring of the outer screen. A supply line 138 connects the inlet tube to a source of liquid to be treated, such as the arm of a patient P as shown in FIG. 1, while a return line 140 connects the outlet tube to the source for returning the treated liquid.

The dialysate reservoir 22 contains a concentrated supply of dialysate which is positively metered and mixed with tap water before being fed into the dialysis tank 18. A retractable siphon 142 is connected to the dialysate reservoir and to a line 144 that is connected with a proportioning pump 146 so that concentrated dialysate is supplied to the pump. Hot tap water is fed to a line 148 and cold tap water is fed to a line 150, both lines being connected to a thermostat controlled mixing valve 152, which is coupled by a supply line 154 to the proportioning pump. Thus, water at an optimum temperature is fed to the proportioning pump. Reduction drive shaft 52 extends upward from the mount-arm 50 and has a crank arm 156 mounted thereon which controls a piston rod 158 fitting within the proportioning pump. A water piston 157 and a dialysate piston 159 are fixed to the piston rod and positioned within respective chambers of the pump. Reciprocation of the piston rod positively meters fixed amounts of concentrated dialysate and water to be pumped per stroke. A water supply line 160 and a dialysate supply line 162 extend from the pump to a mixing chamber 164 and a port 166 is provided between the mixing chamber and the dialysis tank for feeding the mixed dialysate solution therein.

An overflow outlet 168, as shown in FIG. 2, is provided near the top of the dialysis tank 18 and is connected by a hose connection, not shown, to a sink drain. Since dialysate solution is continuously pumped into the tank during treatment operation, this outlet provides for the overflow. A bottom drain within the dialysis tank is connected to a drain outlet 170, shown in FIG. 1, enabling the dialysis tank to be drained after each treatment.

When using the dialyzer 10 as an artificial kidney machine for purifying the blood of a patient P, the dialyzer is placed at a convenient location adjacent the patient. Cover 26 is removed and the inner screen 96 is raised to a loading position by the handle 104, where the detent 110 engages within the radial groove 72. The dialysis conduit 126 is wrapped about the outer circumference of the inner screen, which is then returned to a lower position within the dialysis tank, and the dialysis conduit is positioned between the inner and outer screens. Supply lines 138 and 140 are connected to the forearm of a patient so that blood can flow through the dialysis conduit and return.

Concentrated dialysate is mixed with water in the mixing chamber 164 to form a proper dialysate solution which flows through an opening 166 into the dialysis tank 18. The dialysate solution flows radially outward within the tank and passes upward through circulation holes 120. Then the dialysate solution flows downward through the opening 102 in the inner screen cover 100 and through perforations 76 in the top plate 78 of the distributor assembly 74. Rotation of the distributor assembly forces the dialysate solution to flow radially outward between the vertical vanes 82 and between the converging vanes 92 and 94 which form nozzles 95 on the nozzle rotor assembly. Jet streams of dialysate solution are forced through the nozzles and impinge against the dialysis conduit, forcing the face of the dialysis conduit outward from the inner screen and pinching the conduit against the outer screen, opposite each nozzle. A pocket B of blood is trapped between adjacent jet streams and as the nozzle rotor moves in a direction counterclockwise about the tank, the trapped pockets of blood are impelled to flow from the inlet tube 128 around the dialysis conduit to the outlet tube 130. The dialysate solution, after impinging against the dialysis conduit 126, flows downward adjacent the inner screen and then upward through circulation holes 120, behind the outer screen. This provides circulation of dialysate solution on both sides of the conduit as blood is forced to flow within the conduit. Effective dialysis takes place as the blood passes through the conduit and it is returned to the patient P through line 140. Any excess dialysate solution is discharged through overflow outlet 168 to a sink drain.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A method of liquid handling which includes the steps of directing a liquid to be conveyed to flow into an elongated conduit made of a flexible membrane, directing a plurality of jet streams of fluid to impinge in spaced relationship to each other against one side of the conduit and moving the jet streams of fluid along the conduit in spaced relationship to impel a quantity of liquid within the conduit disposed between the impinging jet streams to flow therein in response to the movement of the jet streams.

2. A liquid conveyor comprising an elongated conduit made of a flexible membrane having an inlet at one end and an outlet at the opposite end thereof through which a liquid to be conveyed flows, at least one pair of nozzles positioned substantially perpendicular to the conduit for directing jet streams of fluid to impinge in spaced relationship to each other against the conduit, support means positioned on the opposite side of the conduit from the pair of nozzles to brace the conduit against the impinging jet streams of fluid, and means for moving the pair of nozzles directing the jet streams of fluid to travel in spaced relationship along the conduit impelling liquid therein between the impinging jet streams to flow from the inlet to the outlet thereof.

References Cited

UNITED STATES PATENTS

| 2,568,990 | 9/1951 | Daniel | 210—22 |
| 2,829,600 | 4/1958 | Sueda | 103—152 |
| 3,039,309 | 6/1962 | Vesper et al. | 103—44 |
| 3,154,021 | 10/1964 | Vick | 103—152 |
| 3,175,498 | 3/1965 | Rohrer | 103—44 |
| 3,305,097 | 2/1967 | Natelson | 210—321 |
| 3,418,940 | 12/1968 | Martin | 103—152 |

FOREIGN PATENTS 894,503 10/1953 Germany.

HENRY F. RADUAZO, Primary Examiner

U.S. Cl. X.R.
210—23; 417—474